United States Patent
Hoecker

(10) Patent No.: US 6,277,162 B1
(45) Date of Patent: Aug. 21, 2001

(54) APPARATUS FOR DEPOSITING SOLIDS FROM AN AIR CURRENT

(75) Inventor: Frank Hoecker, Osnabrueck (DE)

(73) Assignee: Hoecker Polytechnik GmbH, Hilter (DE)

( * ) Notice: Subject to any disclaimer, the term of this patent is extended or adjusted under 35 U.S.C. 154(b) by 0 days.

(21) Appl. No.: 09/451,250

(22) Filed: Nov. 29, 1999

(30) Foreign Application Priority Data

Nov. 27, 1998 (DE) .......................................... 298 21 221 U

(51) Int. Cl.$^7$ ............................. B01D 50/00; B01D 29/68
(52) U.S. Cl. ................... 55/283; 55/302; 55/318; 55/413; 55/424; 55/430; 55/467
(58) Field of Search ....................... 55/283, 291, 297, 55/315, 318, 413, 424, 430, 431, 467; 19/200, 205

(56) References Cited

U.S. PATENT DOCUMENTS

| | | | | |
|---|---|---|---|---|
| 1,693,754 | * | 12/1928 | Henry | 55/430 |
| 1,721,778 | * | 7/1929 | Hancock | 55/430 |
| 2,114,553 | * | 4/1938 | Woodford | 55/430 |
| 2,696,025 | * | 12/1954 | Vandergriff | 19/205 |

FOREIGN PATENT DOCUMENTS

192803 * 9/1986 (EP).

* cited by examiner

*Primary Examiner*—David A. Simmons
*Assistant Examiner*—Robert A. Hopkins
(74) *Attorney, Agent, or Firm*—Jordan and Hamburg LLP

(57) ABSTRACT

An apparatus for depositing solids from a current of air includes a bucket wheel lock, taking up this air current over a connecting opening. This apparatus has a built-in drum with a rotatably supported bucket wheel. On the one hand, a screen is provided in the drum, on which coarse solid particles are deposited from the air current and, on the other, a discharge opening for the separated coarse solids is provided. An air current, still containing fine dust particles, is supplied to a dust filter which, in the direction of flow, is behind the screen. In the direction of flow of the dust-containing air current, behind an essentially horizontal upper region of the screen, facing the dust filter, the bucket wheel lock is provided with an air current deflection, which brings about a surface removal of dust at the back side of the screen.

24 Claims, 6 Drawing Sheets

APPARATUS FOR DEPOSITING SOLIDS FROM AN AIR CURRENT

BACKGROUND OF THE INVENTION

Figure 1:
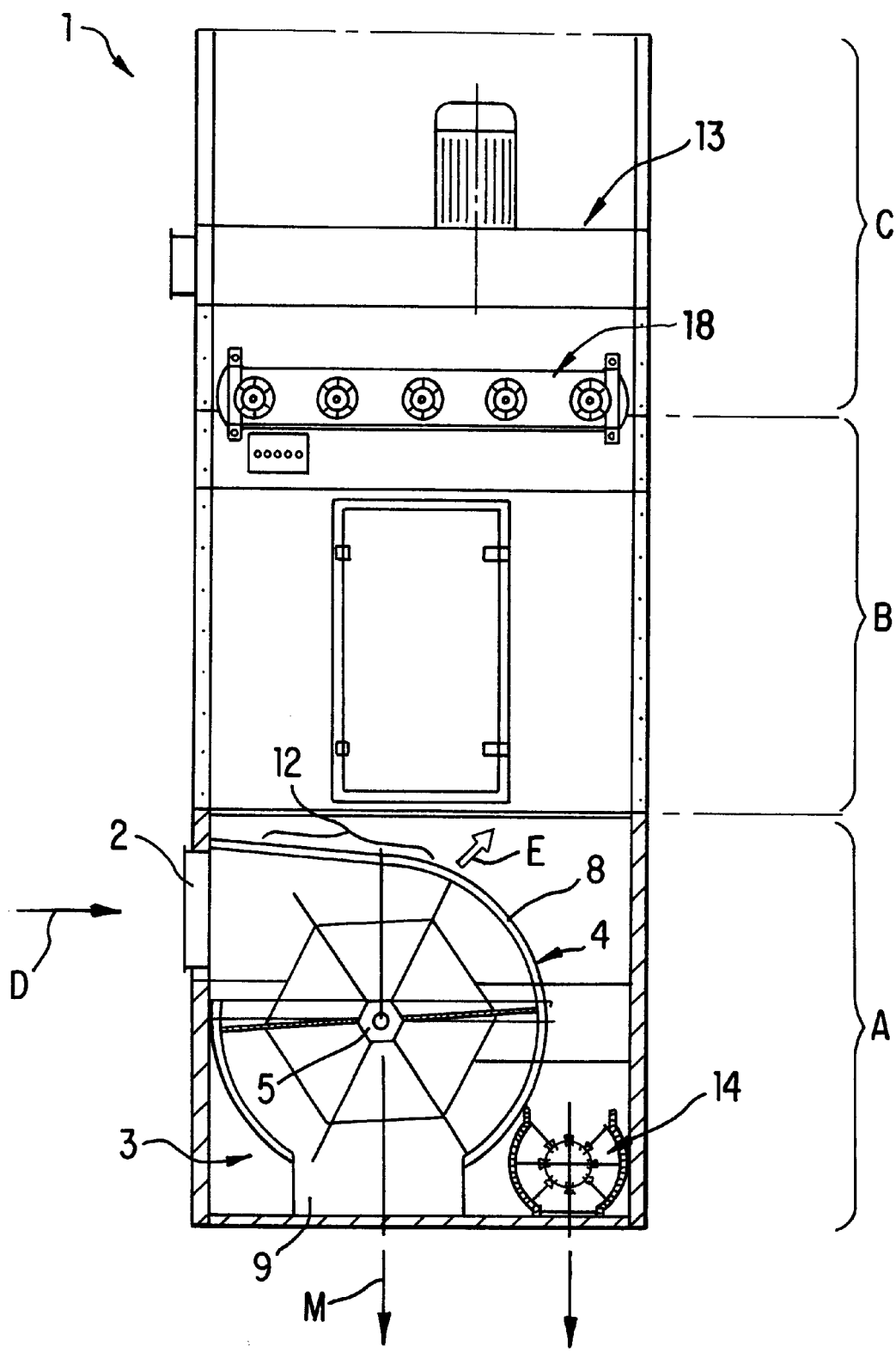

Known apparatuses for depositing solids from an air current (EP 0 192 803) are provided with a bucket wheel lock, in the built-in drum of which a bucket wheel, which takes up an air current, is rotatably supported at the connection side. Coarsely particulate and finely grained solid particles are conveyed into this built-in drum over the connecting opening and the coarse particles are deposited by means of a screen, which forms the boundary of the built-in drum at the wall. The air current, still containing the dust-like fine particles, is passed over a pipe connection which, in the direction of the current, is behind the screen, into a dust filter, which must be cleaned at intervals.

SUMMARY OF THE INVENTION

The invention is concerned with the problem of combining the structural components for depositing coarse and fine solids from an air current into a common apparatus, for which, with little technical effort, the deposition of fine particles at the screen is prevented, a compact arrangement of the component parts enabling dust to be removed automatically with little control effort even when the dust filter is in the vicinity of the screen.

The inventive apparatus for depositing solids from an air current is constructed as a compact structural unit with dust filters disposed above the bucket wheel lock, the structural components being integrated in the depositing system in such a manner, that an optimum depositing process without any mutual effect on the functions is assured and, in addition to the coarse and fine filtering process taking place in a main direction flow, an automatic removal of dust from the apparatus can be carried out in the region of the fine filter.

This dust removal can be attained with little technical effort, few additional component parts and a simple, adaptable control. During the dust removal, a directional component to the region of a second discharging opening, located in the vicinity of the built-in drum, can be imparted by means of a deflection of the air current, which brings about a surface removal of dust, to the dust-containing air volume located behind the screen. With this deflection of the air current, deposits on the back side of the screen can be avoided already during the filtering operation. Over an additional transverse entry of air by means of a switching over of the controls of the apparatus, the deflection of the air current to the second discharge opening can be used for a rapid and automatically controllable cleaning in the region of the fine filter.

In the case of such a cleaning cycle, the dust filter is cleaned by means of a mechanical shaking apparatus and/or a current of cleaning air, which is switched on counter to the direction of flow of the apparatus, so that the dust residues, which are partially lumpy and detached from the dust filter, fall off and, under the action of gravity, are shifted in the direction of the back side of the screen. Simultaneously with this cleaning of the dust filter, clean, fresh air can be aspirated over the connecting opening of the bucket wheel lock in such a manner, that this air is pressed through the openings of the screen counter to the dust residues. In the region of the openings, baffles are provided, so that the fresh air, entering in the flow direction, experiences an essentially horizontal deflection, so that an air current, with a directional component towards the discharging opening of the subsidiary lock, is superimposed on the dust-containing air volume and the dust residues, falling off in the direction of the screen, reach the discharging opening and are transported away here.

To support the flow of this cleaning process, provisions are made, in a similarly acting construction or as an additional structural component, to build up above the back side of the screen an additional transverse conveying flow of air, which is switched on during the cleaning of the fine filter and deflects the dust particles to the subsidiary discharging outlet. The deflection process for cleaning the back side of the screen can be accomplished by means of an additional fan or by a compressed air cylinder with a nozzle, so that automatic cleaning process of the apparatus takes place at specified intervals through the agency of an appropriate control unit.

This automatic cleaning of the fine filter can be controlled by an optimum positioning of the bucket wheel, lying against the wall in the built-in drum, in combination with a decreased clean air suction effort of the main fan of the apparatus. While the fine filter is being cleaned (for example, by means of a shaking apparatus), a partial region of the screen is covered by means of bucket wheel positioned under the control of a sensor, so that the fresh air, aspirated in the region of the bucket wheel lock, can flow at a higher pressure through the screen into a region at a distance from the subsidiary outlet and, with that, the deposition of lumpy dust residues is avoided in this region through which there is flow. By swiveling the controlled bucket wheel, the screen is increasingly released for the flow of air and, with that, the discharge of dust residues over the whole upper region of the screen is attained.

Further details and advantageous effects of the invention arise out of the following description and the accompanying drawings.

IN THE DRAWINGS

Figure 2:
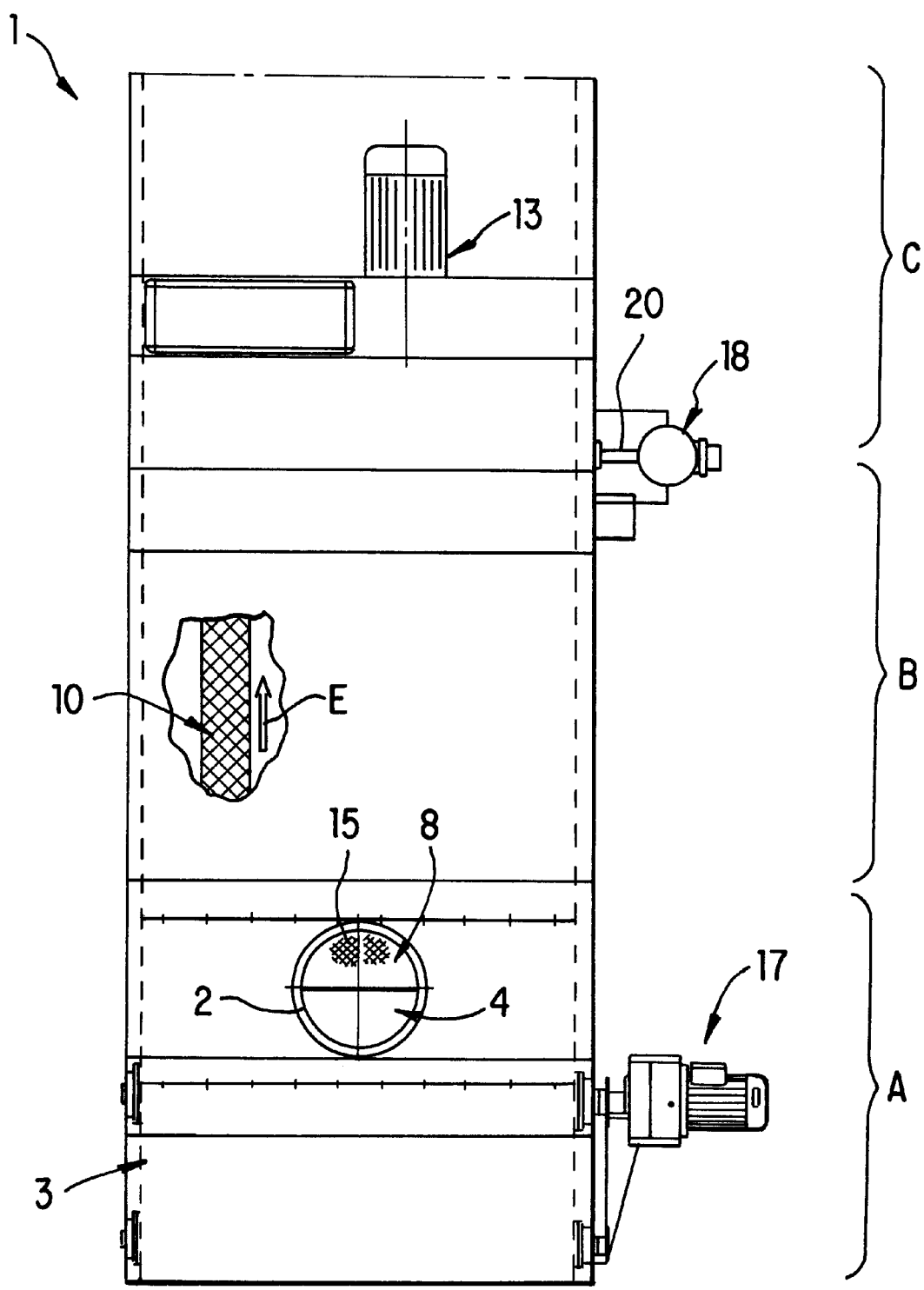
Figure 3:
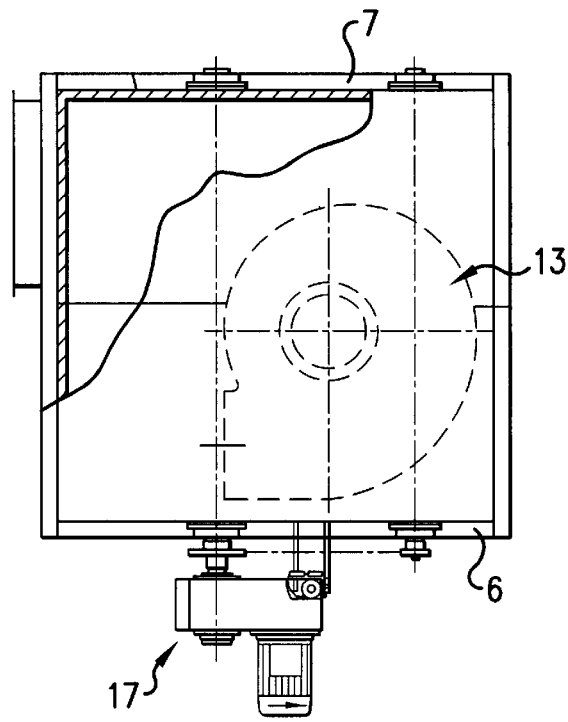
Figure 4:
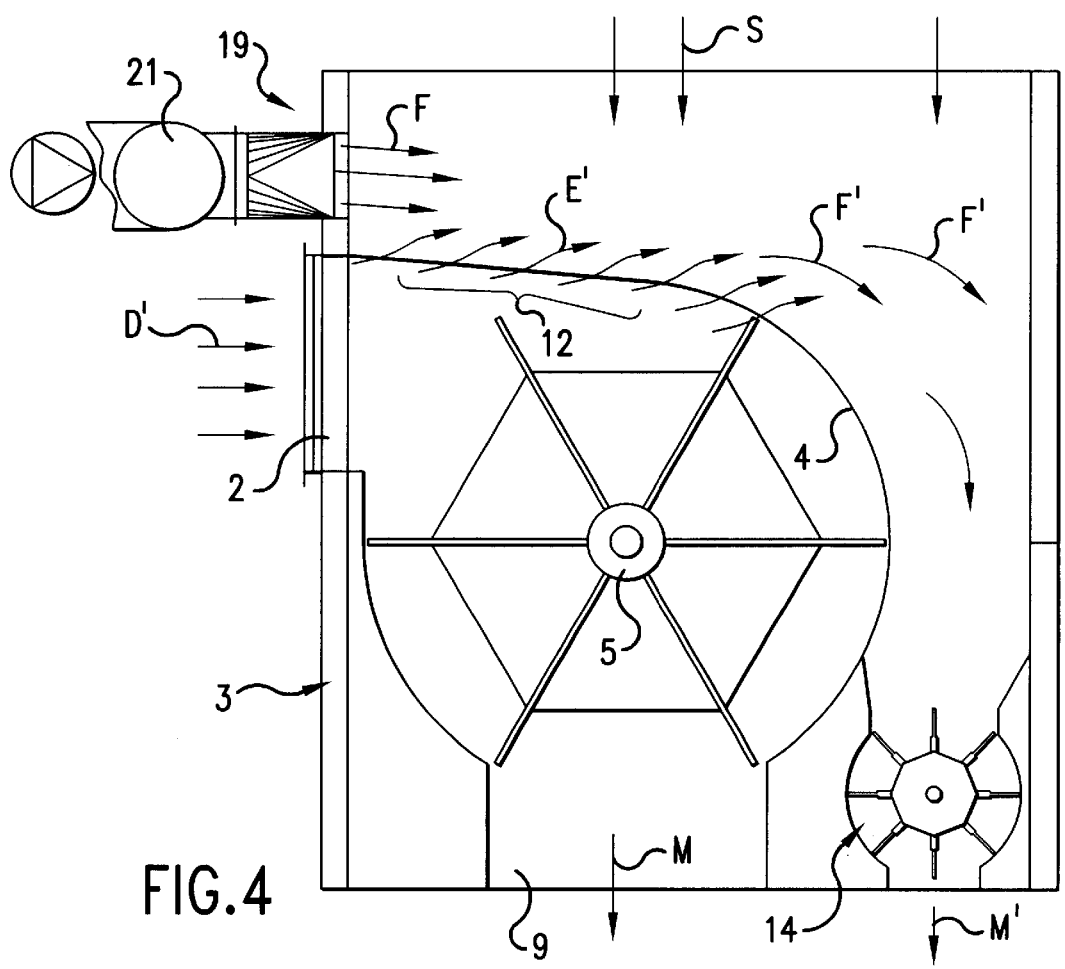
Figure 5:
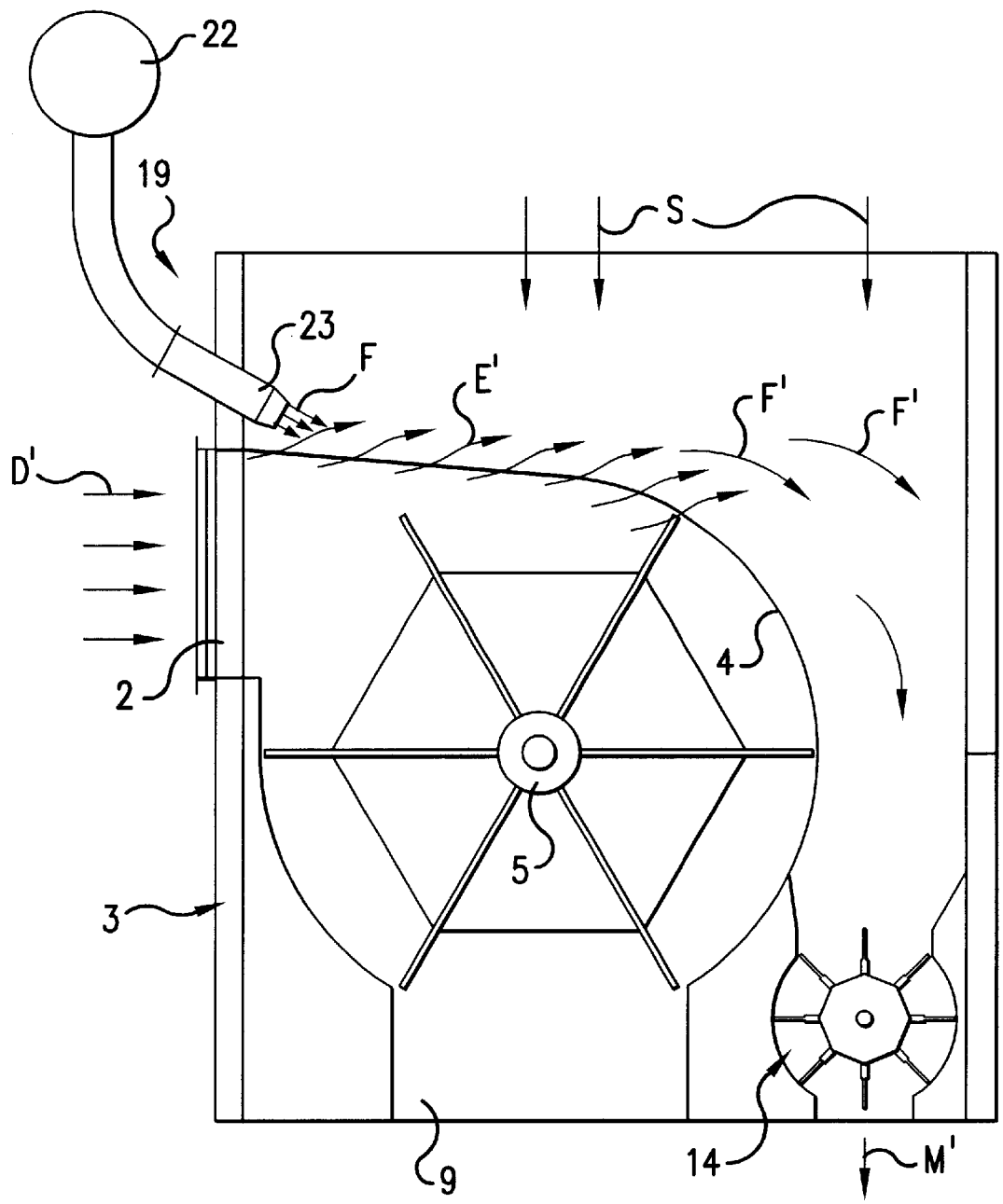
Figure 6:
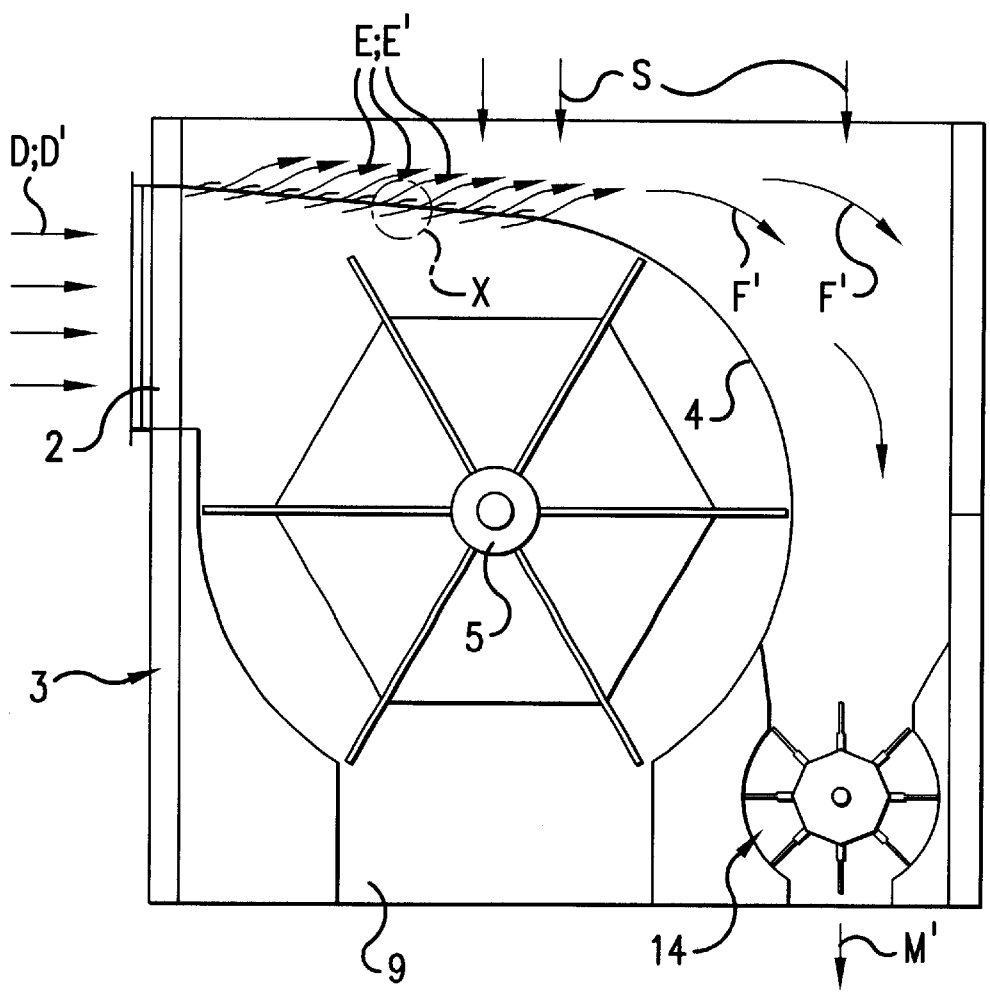
Figure 7:
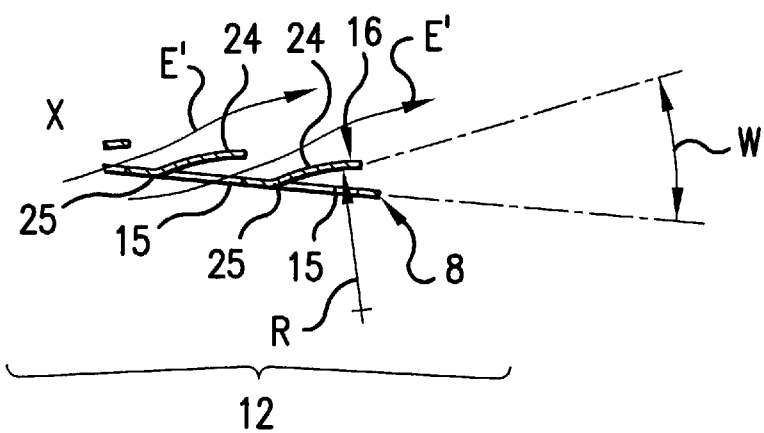
Figure 8:
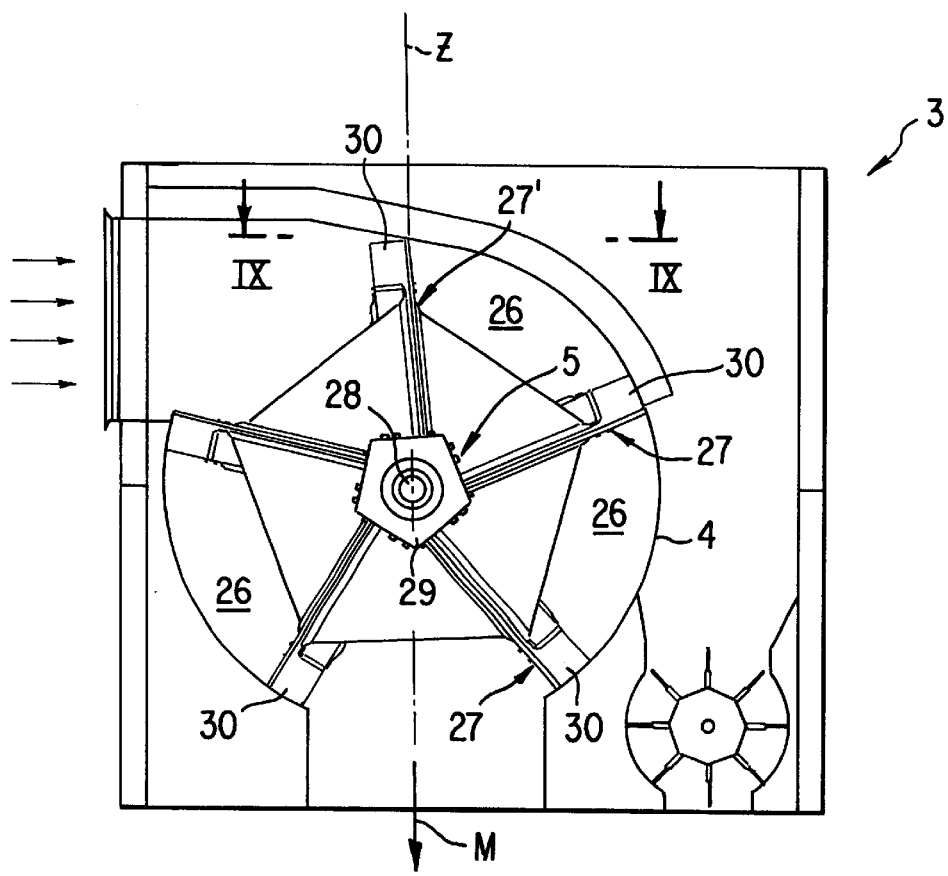
Figure 9:
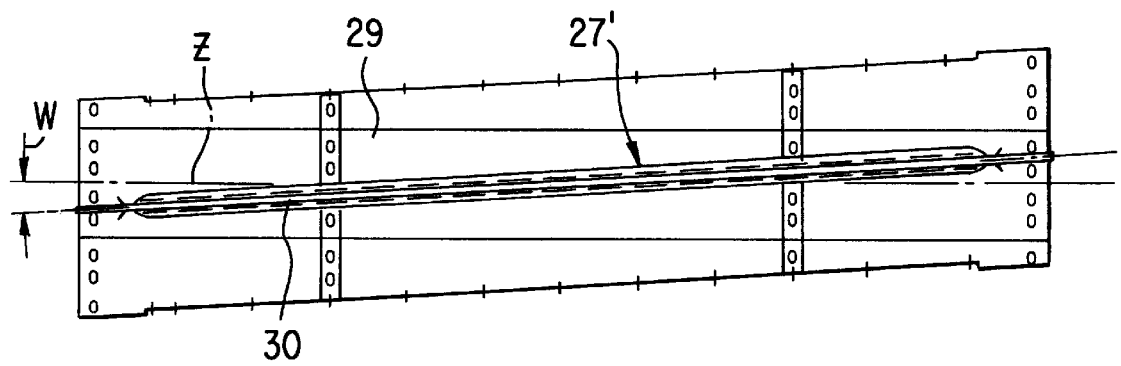

FIG. 1 shows a partially sectional front view of the apparatus with the structural components disposed above one another, FIG. 2 shows a partially sectional side view of the apparatus of FIG. 1, FIG. 3 shows a partially sectional plan view of the apparatus of FIG. 1, FIG. 4 shows a sectional, diagrammatic representation of the apparatus in the region of a bucket wheel, FIG. 5 shows a diagrammatic representation similar to FIG. 4 with a second embodiment of the bucket wheel lock, FIG. 6 shows a diagrammatic representation similar to FIG. 4 with a built-in drum, which is in the bucket wheel lock and has a baffle profile, FIG. 7 shows an enlarged, sectional representation of the built-in drum in the region of a screen, FIG. 8 shows a diagrammatic representation of the apparatus similar to FIG. 4 with a modified bucket wheel in the bucket wheel lock, and FIG. 9 shows an enlarged sectional representation of the bucket wheel in the region of a cell wall in accordance with a line IX—IX in FIG. 8.

DESCRIPTION OF THE PREFERRED EMBODIMENTS

FIG. 1 shows an apparatus, which is labeled 1 as a whole and is intended for the deposition of solids from a current of air (arrow D). The apparatus 1 has a bucket wheel lock 3, which takes up the current of air D over a connecting opening 2 and in the built-in drum 4 of which a bucket wheel 5, supported in the region of the side walls 6, 7 (FIG. 3), can be rotated. On the one hand, the built-in drum 4 has a screen 8, which deposits the coarse solid particles from the current of air D. On the other, an opening 9 is provided for discharging the coarse solids (arrow M), which have been separated. A current of air (arrow E), which still contains fine dust particles, is supplied to a dust filter 10 (FIG. 2) which, in the direction of flow, is behind the screen 8.

In an inventive development, the apparatus 1 is provided with a bucket wheel lock 3 which, in the flow direction of the current of air D on the inlet side or of the "dust-containing" current of air E is provided behind an essentially horizontal upper region 12 of the screen 8, facing the dust filter 10, with an air current deflection mechanism, which brings about surface removal of dust from the back side region of the screen 8. This deflection of the air current is the basis for the structural changes in the deposition system, which can be adapted with little effort to different, customer-specific different installation conditions, such as the assembled height.

The apparatus 1 has a structural component A in the region of the bucket wheel lock 3 with the screen 8, a structural component B in the region of the dust filter 10 collecting the fine particles of the air current E and a structural component C in the region of the main fan 13, which generates the air currents D, E by means of a reduced pressure. When placed one above the other, the structural components A, B, C (FIG. 1) can, in an advantageously compact construction, form a structural unit with integrated functions. In the vicinity of its built-in drum 4, provided with the screen 8 at the wall, the bucket wheel lock 3, as a known structural component A, has a subsidiary lock, which is labeled 14 as a whole and is provided for discharging the dust residues M', which are deposited by the dust filter 10 of the structural component B.

In the case of an automatic cleaning cycle within the apparatus 1, the upper, essentially horizontal region 12 of the screen 8 can also be cleaned owing to the fact that, in a structurally very simple construction, the openings 15 (FIG. 2) in the upper region 12 of the screen 8 are constructed with a contour, which impresses on the air current E', passing through, a directional component for the surface removal of dust. In an appropriate construction, this contour of the opening can be formed by baffle profile 16 (FIG. 6, FIG. 7) assigned to the openings 15 in the upper region 12 of the screen 8.

The structural unit A, B, C has a common control unit (not shown), by means of which a driving mechanism 17 of the two locks 3 and 14, the main fan 13, a compressed air supply, constructed as a compressed air pulsed shaker 18, for a current of cleaning air in the dust filter 10 and a compressed air input 19 into the bucket wheel lock 3, provided for diverting the air current, can be controlled in such a manner, that dust deposits from the turbulent air volume are prevented by means of a defined air current F (FIG. 4) above the screen 8 especially when the dust filter 10 is cleaned.

In the diagrammatic representations of FIGS. 4 to 6, the flow relationships in the upper region 12 of the screen 8 are shown during the cleaning. The representations of FIGS. 4 and 5 illustrate the flow deflection indicated by arrow F and produced by the additional air input 19, in interaction with the clean air current E', which is produced by means of the main fan 13, which is connected especially with little power over a fresh air supply D' in the region of the connecting opening 2. The supply of dust residues from the fine filter 10, illustrated by arrows S, can take place simultaneously.

For this purpose, the mechanical cleaning apparatus 18 (FIG. 2), provided above the fine filter 10, is actuated and the largely lumpy dust residues S fall under the action of gravity also in the direction of the screen 8. For this cleaning, the compressed air supply 20 is provided, which produces in the region of the upper main fan structural component 13 a current of cleaning air counter to the flow direction E of the apparatus 1. The cleaning apparatus 18 may be constructed in the form of the compressed air pulsed shaker 18.

For the input 19 of compressed air in the region of the bucket wheel lock 3, the latter is provided with an additional fan 21 (FIG. 4), which can be connected, or, in a second embodiment, with an external compressed air tank 22 (FIG. 5), this compressed air input 19 discharges in each case above the connecting opening 2 into the built-in drum 4. The compressed air input 19 can be directed accurately onto the screen 8 by means of a nozzle 23 (FIG. 5).

Looking at FIGS. 6 and 7 together makes it clear how the air current is deflected by means of the baffle profile 16, which is formed by respective guiding shoulders 24, which are supported in the upper region of the openings 15 and extend their passage contour in the flow direction E'. These guiding shoulders 24 extend only over a portion of the periphery of the openings 15, the guiding shoulders 24 being fastened to a peripheral part 25 of the opening, facing the inlet of the air current E'. An angle W makes it clear that the guiding shoulders 24 are inclined to the upper region 12 of the screen 8, so as to impress a directional component on the air stream E'. In addition, the guiding shoulders 24 can be constructed arc-shaped, with the radius R, in the flow direction E', so that a further intensification of the deflection in the direction to the material discharge M' of the subsidiary lock 14 (FIG. 5) can be achieved.

For the dust-removing cycle of the apparatus 1, described above, it is of particular importance in the upper region 12 of the screen 8 that the cross section of the openings 15 is overlapped by the guiding shoulders 24 so that, in plan view, an essentially complete covering of the cross sections of the openings is attained. The dust residues, which come to lie on the screen 8 when the filter 10 is shaken off in the direction S, cannot fall through into the built-in drum 4, so that blockage of the openings 15 or the entry of dust residues through the screen 8 into the region of the bucket wheel lock 3 is reliably prevented and, with that, the reliability of the structural unit A, B, C under rough operating conditions is also ensured.

In FIG. 8, the bucket wheel lock 3 is shown in a second embodiment, the bucket wheel 5 being provided with five cell walls 27 (in FIGS. 4 to 6 in each case six cell walls 27 are shown), which form respective cells 26 in the essentially cylindrical built-in drum 4. In looking at FIGS. 8 and 9, it becomes clear that the cell walls 27 in the region of a bucket wheel shaft 28, are supported on a hub part 29 and in each case have an inclined position W intersecting a generatrix parallel to the axis of the drum shell, this generatrix, parallel to the axis of the drum shell. In the region of the cell wall 27', this generatrix, parallel to the axis of the drum shell, essentially coincides with the central longitudinal plane Z of the shaft 28. During the rotation of the bucket wheel 5, this inclined position W brings about a uniform increase in the sealing contact of the respective sealing lips 30, provided at the ends of the cell walls 27, 27' at the cylindrical shell inner side of the built-in drum 4, so that a sudden sealing engagement is avoided, the air current is divided continuously in the apparatus 1 and, with that, a "breathing noise", caused by the apparatus 1, is significantly reduced.

What I claim is:

1. Apparatus for depositing solids from a current of air comprising a housing structure having an inlet opening for a current of air, an air lock unit in said housing structure juxtaposed to said inlet opening, said air lock unit including a bucket wheel rotatable supported in said housing structure juxtaposed to said inlet opening, said air lock unit including a screen disposed at least partially about said bucket wheel for removing coarse solid particles from said current of air, said housing structure having a first discharge opening through which said air current is discharged and a second discharge opening through which said coarse solid particles are discharged, a filter in said housing structure downstream of said screen for removing fine particles from said air current, said screen device having a deflecting region generally underlying the filter, said deflecting region including air current deflectors which receive the fine particles removed by the filter to effect removal of said fine particles from the housing structure.

2. Apparatus according to claim 1 wherein said deflectors define passage contour openings which impress on the air current a directional component for removal of said fine particles from said deflectors.

3. Apparatus according to claim 1 wherein said housing structure includes another inlet opening, a compressed air unit supplying compressed air to said other inlet opening, said compressed air being directed to said deflecting region of said screen.

4. Apparatus according to claim 1 including a reduced pressure unit for producing a reduced pressure in said housing structure.

5. Apparatus according to claim 4 wherein said housing structure includes a lower sub-housing structure for said bucket wheel and said screen, an intermediate sub-housing structure for said filter, and an upper sub-housing structure for said reduced pressure unit.

6. Apparatus according to claim 4 wherein the air current flows through the housing structure in a flow direction sequentially through said inlet opening, said air lock unit, said screen device and said first discharge opening, a first compressed air unit in said housing structure for introducing compressed air into said housing structure for flow in a direction counter to said flow direction, a second compressed air unit on said housing structure for directing a flow of compressed air to said deflecting region of said screen device, a subsidiary air lock unit in said housing structure through which said fine particles are discharged from said housing structure, and a common control unit for controlling operation of said air lock unit, said subsidiary air lock unit, said first and second compressed air units and the reduced pressure unit.

7. Apparatus according to claim 1 including a subsidiary air lock unit in said housing structure through which said fine particles are discharged from said housing structure.

8. Apparatus according to claim 7 including a common drive for said bucket wheel and said subsidiary air lock unit.

9. Apparatus according to claim 1 wherein the air current flows through the housing structure in a flow direction sequentially through said inlet opening, said air lock unit, said screen device and said first discharge opening, and a compressed air unit in said housing structure for introducing compressed air into said housing structure for flow in a direction counter to said flow direction.

10. Apparatus according to claim 1 further comprising a compressed air unit in said housing structure juxtaposed to said air lock unit for directing a flow of compressed air to said deflecting region of said screen device.

11. Apparatus according to claim 1 wherein said deflecting region includes a plurality of openings and baffles overlying said openings.

12. Apparatus according to claim 11 wherein each of said openings has a peripheral edge, said baffles being joined to a portion of said peripheral edge.

13. Apparatus according to claim 12 wherein said baffles extend generally upwardly from said portion of said periphery.

14. Apparatus according to claim 11 wherein said baffles have a configuration generally conforming to the configuration of said openings.

15. Apparatus according to claim 11 wherein said baffles overlie substantially the entire respective opening.

16. Apparatus according to claim 1 wherein said deflectors have at least a partial arcuate cross sectional configuration.

17. Apparatus according to claim 1 wherein said deflectors have at least a partial generally circular cross sectional configuration.

18. Apparatus according to claim 1 wherein said deflecting region has openings, and baffles generally overlying said openings, said baffles directing the air passing through said openings in a direction inclined relative to horizontal.

19. Apparatus according to claim 1 wherein said deflecting region has a generally planar wall, openings in said wall, and baffles connected to said wall and overlying said openings.

20. Apparatus according to claim 19 wherein said baffles direct the air passing through said openings in a direction inclined relative to said planar wall.

21. Apparatus according to claim 19 wherein said planar wall is slightly inclined relative to horizontal.

22. Apparatus according to claim 19 wherein said planar wall is generally horizontally disposed.

23. Apparatus according to claim 1 wherein said bucket wheel has an axis of rotation, said bucket wheel having at least two cell walls operable as discharging blades for the coarse solid particles, each of said cell walls being generally planar cell walls disposed at an acute angle relative to the axis of rotation of the bucket wheel.

24. Apparatus for depositing solids from a current of air comprising a housing structure having an inlet opening for a current of air, an air lock unit in said housing structure juxtaposed to said inlet opening, said air lock unit including a screen for removing coarse solid particles from said current of air, said housing structure having a first discharge opening through which said air current is discharged and a second discharge opening through which the removed coarse solid particles are discharged, a filter in said housing structure downstream of said screen for removing fine particles from said air current, said screen device having a deflecting region generally underlying the filter, said deflecting region including air current deflectors which receive the fine particles removed by the filter to effect removal of said fine particles from the housing structure.

* * * * *